(12) United States Patent
Hino et al.

(10) Patent No.: US 11,327,043 B2
(45) Date of Patent: May 10, 2022

(54) SENSOR ELEMENT FOR GAS SENSOR

(71) Applicant: NGK INSULATORS, LTD., Nagoya (JP)

(72) Inventors: Takashi Hino, Kasugai (JP); Atsushi Watanabe, Kasugai (JP); Ryo Hayase, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 101 days.

(21) Appl. No.: 16/827,754

(22) Filed: Mar. 24, 2020

(65) Prior Publication Data

US 2020/0309730 A1    Oct. 1, 2020

(30) Foreign Application Priority Data

Mar. 29, 2019   (JP) .............................. JP2019-066733

(51) Int. Cl.
*G01N 27/407*   (2006.01)
*G01N 27/406*   (2006.01)
*G01N 27/417*   (2006.01)

(52) U.S. Cl.
CPC ..... *G01N 27/4071* (2013.01); *G01N 27/4067* (2013.01); *G01N 27/4077* (2013.01); *G01N 27/417* (2013.01)

(58) Field of Classification Search
CPC ................................................ G01N 27/4077
See application file for complete search history.

(56) References Cited

U.S. PATENT DOCUMENTS

2009/0020424 A1*  1/2009  Schneider .......... G01N 27/4075
                                                             204/421
2017/0284958 A1* 10/2017  Watanabe .......... G01N 27/4077

FOREIGN PATENT DOCUMENTS

JP          5387555  B2       1/2014

OTHER PUBLICATIONS

Unexamined U.S. Appl. No. 16/827,753, filed Mar. 24, 2020.
Unexamined U.S. Appl. No. 16/827,759, filed Mar. 24, 2020.

* cited by examiner

*Primary Examiner* — Alexander S Noguerola
(74) *Attorney, Agent, or Firm* — Mattingly & Malur, PC

(57) ABSTRACT

A gas sensor element includes: an element base being a ceramic structure including a sensing part; and a leading-end protective layer being a porous layer disposed around an outer periphery of the element base in a predetermined range on a side of the sensing part. The leading-end protective layer includes: a first layer disposed at least on two main surfaces of the element base; a second layer disposed to cover the end portion and four side surfaces of the element base including the two main surfaces; and a third layer disposed to cover the second layer. The second layer has a porosity of 30% to 80%, and has a thickness of 30 to 50 times thickness of the first layer, and the third layer has a porosity of 15% to 30%, and has a thickness of 5 to 10 times the thickness of the first layer.

4 Claims, 3 Drawing Sheets

SENSOR ELEMENT FOR GAS SENSOR

CROSS-REFERENCE TO RELATED APPLICATION

The present application claims priority from Japanese application JP 2019-066733, filed on Mar. 29, 2019, the contents of which is hereby incorporated by reference into this application.

BACKGROUND OF THE INVENTION

Field of the Invention

The present invention relates to a sensor element for a gas sensor, and, in particular, to a surface protective layer thereof.

Description of the Background Art

As a gas sensor for determining concentration of a desired gas component contained in a measurement gas, such as an exhaust gas from an internal combustion engine, a gas sensor that includes a sensor element made of an oxygen-ion conductive solid electrolyte, such as zirconia ($ZrO_2$), and including some electrodes on the surface and the inside thereof has been widely known. As the sensor element, a sensor element having an elongated planar shape, including a protective layer formed of a porous body (porous protective layer) in an end portion in which a part for introducing the measurement gas is provided, and further including a surface protective layer having a smaller porosity than the porous protective layer outside the porous protective layer has been known (see Japanese Patent No. 5387555, for example).

The protective layer is provided to the surface of the sensor element to secure water resistance of the sensor element when the gas sensor is in use. Specifically, the protective layer is provided to prevent water-induced cracking of the sensor element under the action of thermal shock caused by heat (cold) from water droplets adhering to the surface of the sensor element.

In a gas sensor disclosed in Japanese Patent No. 5387555, a surface protective layer is made water repellent at a high temperature (500° C. or more) utilizing the Leidenfrost phenomenon to repel water droplets adhering to a sensor element to thereby prevent water-induced cracking of the sensor element. A porous protective layer is provided to trap poisoning components contained in a measurement gas and to mitigate heat transfer from the surface protective layer to the inside. In Japanese Patent No. 5387555, the amount of water exposure of 10 µL is determined as a reference value for water-induced cracking (water resistance).

SUMMARY

The present invention relates to a sensor element for a gas sensor, and is, in particular, directed to a configuration of a surface protective layer thereof.

It is found, from intensive studies made by the inventors of the present invention, that a sensor element having great water resistance significantly exceeding the reference value disclosed in Japanese Patent No. 5387555 can be achieved by causing the protective layer to include a plurality of layers and by providing the layers so that functions that the respective layers are expected to have are suitably fulfilled.

According to the present invention, a sensor element for a gas sensor includes: an element base being a ceramic structure including a sensing part to sense a gas component to be measured; and a leading-end protective layer being a porous layer, disposed around an outer periphery of the element base in a predetermined range from an end portion of the element base on a side of the sensing part, and including: a first leading-end protective layer disposed at least on two main surfaces of the element base; a second leading-end protective layer disposed to cover the end portion and four side surfaces of the element base including the two main surfaces on which the first leading-end protective layer is disposed; and a third leading-end protective layer disposed to cover the second leading-end protective layer, wherein the second leading-end protective layer has a porosity of 30% to 80%, and has a thickness of 30 to 50 times thickness of the first leading-end protective layer, and the third leading-end protective layer has a porosity of 15% to 30%, and has a thickness of 5 to 10 times the thickness of the first leading-end protective layer.

Accordingly, a sensor element including a leading-end protective layer having great thermal shock resistance to cold caused by adherence of water droplets can thereby be achieved.

It is thus an object of the present invention to provide a sensor element for a gas sensor having greater water resistance than a conventional sensor element.

These and other objects, features, aspects and advantages of the present invention will become more apparent from the following detailed description of the present invention when taken in conjunction with the accompanying drawings.

DESCRIPTION OF THE PREFERRED EMBODIMENTS

<Overview of Sensor Element and Gas Sensor>

Figure 1:
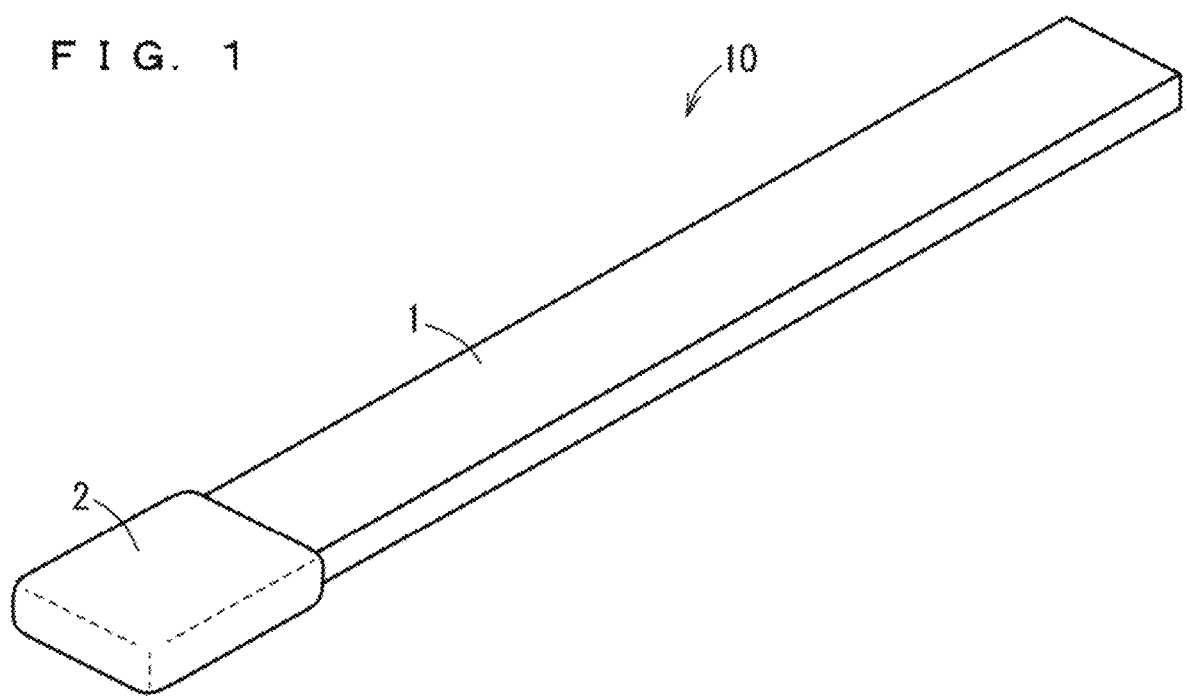
FIG. 1 is a schematic external perspective view of a sensor element 10.
Figure 2:
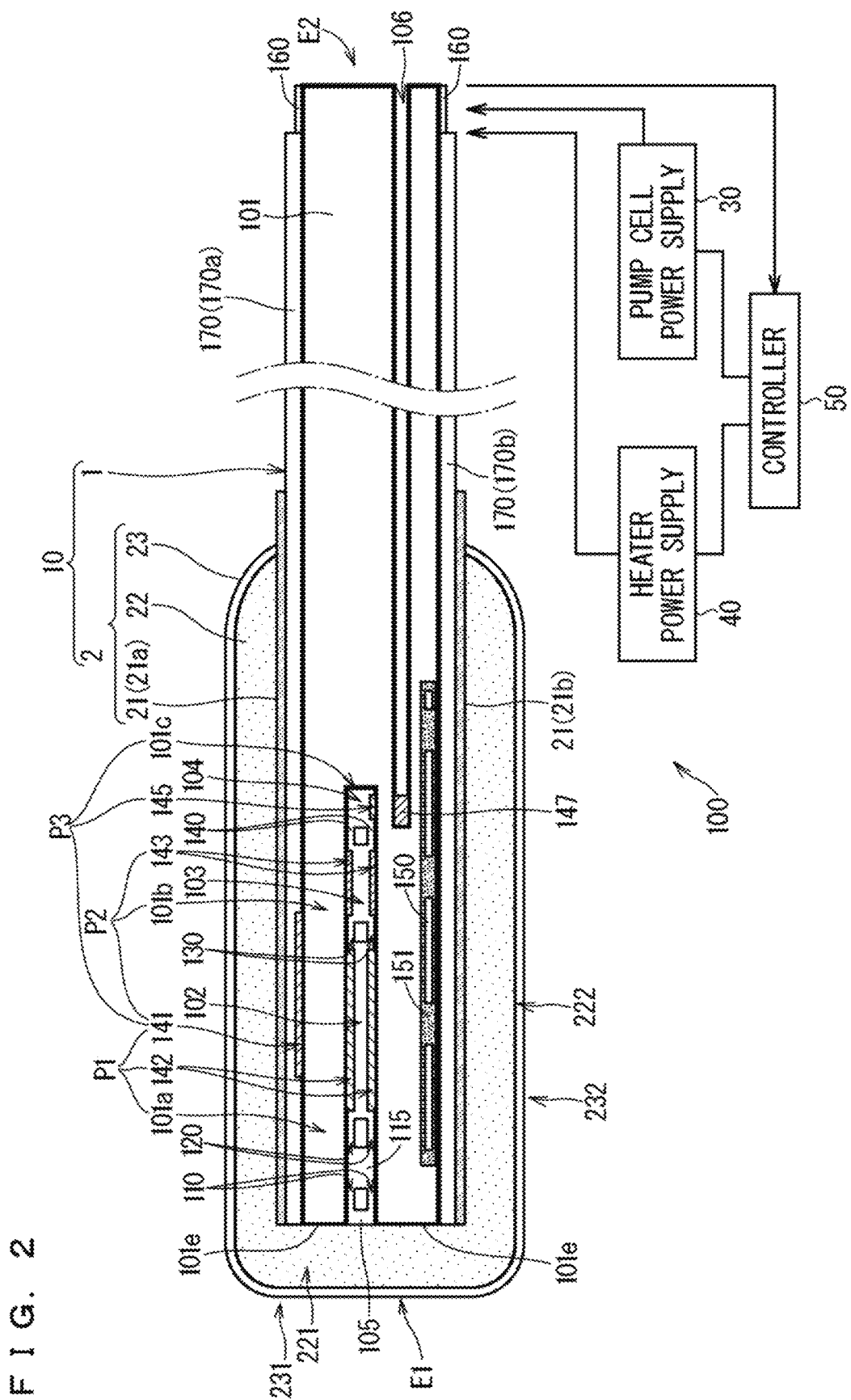
FIG. 2 is a schematic view illustrating a configuration of a gas sensor 100 including a sectional view taken along a longitudinal direction of the sensor element 10.

FIG. 1 is a schematic external perspective view of a sensor element (gas sensor element) 10 according to an embodiment of the present invention. FIG. 2 is a schematic view illustrating a configuration of a gas sensor 100 including a sectional view taken along a longitudinal direction of the sensor element 10. The sensor element 10 is a ceramic structure as a main component of the gas sensor 100 sensing a predetermined gas component in a measurement gas, and measuring concentration thereof. The sensor element 10 is a so-called limiting current gas sensor element.

In addition to the sensor element 10, the gas sensor 100 mainly includes a pump cell power supply 30, a heater power supply 40, and a controller 50.

As illustrated in FIG. 1, the sensor element 10 has a configuration in which one end portion of an elongated planar element base 1 is covered with a porous leading-end protective layer 2. The leading-end protective layer 2 includes three layers: a first leading-end protective layer 21, a second leading-end protective layer 22, and a third leading-end protective layer 23. Details of the leading-end protective layer 2 will be described later.

As illustrated in FIG. 2, the element base 1 includes an elongated planar ceramic body 101 as a main structure, main surface protective layers 170 are provided on two main surfaces of the ceramic body 101, and, in the sensor element 10, the leading-end protective layer 2 is further provided outside both an end surface (a leading end surface 101e of the ceramic body 101) and four side surfaces on one leading end portion. The four side surfaces other than opposite end surfaces in the longitudinal direction of the sensor element 10 (or the element base 1, or the ceramic body 101) are hereinafter simply referred to as side surfaces of the sensor element 10 (or the element base 1, or the ceramic body 101).

The ceramic body 101 is made of ceramic containing, as a main component, zirconia (yttria stabilized zirconia), which is an oxygen-ion conductive solid electrolyte. Various components of the sensor element 10 are provided outside and inside the ceramic body 101. The ceramic body 101 having the configuration is dense and airtight. The configuration of the sensor element 10 illustrated in FIG. 2 is just an example, and a specific configuration of the sensor element 10 is not limited to this configuration.

The sensor element 10 illustrated in FIG. 2 is a so-called serial three-chamber structure type gas sensor element including a first internal chamber 102, a second internal chamber 103, and a third internal chamber 104 inside the ceramic body 101. That is to say, in the sensor element 10, the first internal chamber 102 communicates, through a first diffusion control part 110 and a second diffusion control part 120, with a gas inlet 105 opening to the outside on a side of one end portion E1 of the ceramic body 101 (to be precise, communicating with the outside through the leading-end protective layer 2), the second internal chamber 103 communicates with the first internal chamber 102 through a third diffusion control part 130, and the third internal chamber 104 communicates with the second internal chamber 103 through a fourth diffusion control part 140. A path from the gas inlet 105 to the third internal chamber 104 is also referred to as a gas distribution part. In the sensor element 10 according to the present embodiment, the distribution part is provided straight along the longitudinal direction of the ceramic body 101.

The first diffusion control part 110, the second diffusion control part 120, the third diffusion control part 130, and the fourth diffusion control part 140 are each provided as two slits vertically arranged in FIG. 2. The first diffusion control part 110, the second diffusion control part 120, the third diffusion control part 130, and the fourth diffusion control part 140 provide predetermined diffusion resistance to a measurement gas passing therethrough. A buffer space 115 having an effect of buffering pulsation of the measurement gas is provided between the first diffusion control part 110 and the second diffusion control part 120.

An outer pump electrode 141 is provided on an outer surface of the ceramic body 101, and an inner pump electrode 142 is provided in the first internal chamber 102. Furthermore, an auxiliary pump electrode 143 is provided in the second internal chamber 103, and a measurement electrode 145 as a sensing part to directly sense a gas component to be measured is provided in the third internal chamber 104. In addition, a reference gas inlet 106 which communicates with the outside and through which a reference gas is introduced is provided on a side of the other end portion E2 of the ceramic body 101, and a reference electrode 147 is provided in the reference gas inlet 106.

In a case where a target of measurement of the sensor element 10 is NOx in the measurement gas, for example, concentration of a NOx gas in the measurement gas is calculated by a process as described below.

First, the measurement gas introduced into the first internal chamber 102 is adjusted to have a substantially constant oxygen concentration by a pumping action (pumping in or out of oxygen) of a main pump cell P1, and then introduced into the second internal chamber 103. The main pump cell P1 is an electrochemical pump cell including the outer pump electrode 141, the inner pump electrode 142, and a ceramic layer 101a that is a portion of the ceramic body 101 existing between these electrodes. In the second internal chamber 103, oxygen in the measurement gas is pumped out of the element by a pumping action of an auxiliary pump cell P2 that is also an electrochemical pump cell, so that the measurement gas is in a sufficiently low oxygen partial pressure state. The auxiliary pump cell P2 includes the outer pump electrode 141, the auxiliary pump electrode 143, and a ceramic layer 101b that is a portion of the ceramic body 101 existing between these electrodes.

The outer pump electrode 141, the inner pump electrode 142, and the auxiliary pump electrode 143 are each formed as a porous cermet electrode (e.g., a cermet electrode made of $ZrO_2$ and Pt that contains Au of 1%). The inner pump electrode 142 and the auxiliary pump electrode 143 to be in contact with the measurement gas are each formed using a material having weakened or no reducing ability with respect to a NOx component in the measurement gas.

NOx in the measurement gas caused by the auxiliary pump cell P2 to be in the low oxygen partial pressure state is introduced into the third internal chamber 104, and reduced or decomposed by the measurement electrode 145 provided in the third internal chamber 104. The measurement electrode 145 is a porous cermet electrode also functioning as a NOx reduction catalyst that reduces NOx existing in an atmosphere in the third internal chamber 104. During the reduction or decomposition, a potential difference between the measurement electrode 145 and the reference electrode 147 is maintained constant. Oxygen ions generated by the above-mentioned reduction or decomposition are pumped out of the element by a measurement pump cell P3. The measurement pump cell P3 includes the outer pump electrode 141, the measurement electrode 145, and a ceramic layer 101c that is a portion of the ceramic body 101 existing between these electrodes. The measurement pump cell P3 is an electrochemical pump cell pumping out oxygen generated by decomposition of NOx in an atmosphere around the measurement electrode 145.

Pumping (pumping in or out of oxygen) of the main pump cell P1, the auxiliary pump cell P2, and the measurement pump cell P3 is achieved, under control performed by the controller 50, by the pump cell power supply (variable power supply) 30 applying a voltage necessary for pumping across electrodes included in each of the pump cells. In a case of the measurement pump cell P3, a voltage is applied across the outer pump electrode 141 and the measurement electrode 145 so that the potential difference between the measurement electrode 145 and the reference electrode 147 is maintained at a predetermined value. The pump cell power supply 30 is typically provided for each pump cell.

The controller 50 detects a pump current Ip2 flowing between the measurement electrode 145 and the outer pump electrode 141 in accordance with the amount of oxygen pumped out by the measurement pump cell P3, and calculates a NOx concentration in the measurement gas based on a linear relationship between a current value (NOx signal) of the pump current Ip2 and the concentration of decomposed NOx.

The gas sensor 100 preferably includes a plurality of electrochemical sensor cells, which are not illustrated, sensing the potential difference between each pump electrode and the reference electrode 147, and each pump cell is controlled by the controller 50 based on a signal detected by each sensor cell.

In the sensor element 10, a heater 150 is buried in the ceramic body 101. The heater 150 is provided, below the gas distribution part in FIG. 2, over a range from the vicinity of the one end portion E1 to at least a location of formation of the measurement electrode 145 and the reference electrode 147. The heater 150 is provided mainly to heat the sensor element 10 to enhance oxygen-ion conductivity of the solid electrolyte forming the ceramic body 101 when the sensor element 10 is in use. More particularly, the heater 150 is provided to be surrounded by an insulating layer 151.

The heater 150 is a resistance heating body made, for example, of platinum. The heater 150 generates heat by being powered from the heater power supply 40 under control performed by the controller 50.

The sensor element 10 according to the present embodiment is heated by the heater 150 when being in use so that the temperature at least in a range from the first internal chamber 102 to the second internal chamber 103 becomes 500° C. or more. In some cases, the sensor element 10 is heated so that the temperature of the gas distribution part as a whole from the gas inlet 105 to the third internal chamber 104 becomes 500° C. or more. These are to enhance the oxygen-ion conductivity of the solid electrolyte forming each pump cell and to desirably demonstrate the ability of each pump cell. In this case, the temperature in the vicinity of the first internal chamber 102, which becomes the highest temperature, becomes approximately 700° C. to 800° C.

In the following description, from among the two main surfaces of the ceramic body 101, a main surface (or an outer surface of the sensor element 10 having the main surface) which is located on an upper side in FIG. 2 and on a side where the main pump cell P1, the auxiliary pump cell P2, and the measurement pump cell P3 are mainly provided is also referred to as a pump surface, and a main surface (or an outer surface of the sensor element 10 having the main surface) which is located on a lower side in FIG. 2 and on a side where the heater 150 is provided is also referred to as a heater surface. In other words, the pump surface is a main surface closer to the gas inlet 105, the three internal chambers, and the pump cells than to the heater 150, and the heater surface is a main surface closer to the heater 150 than to the gas inlet 105, the three internal chambers, and the pump cells.

A plurality of electrode terminals 160 are formed on the respective main surfaces of the ceramic body 101 on the side of the other end portion E2 to establish electrical connection between the sensor element 10 and the outside. These electrode terminals 160 are electrically connected to the above-mentioned five electrodes, opposite ends of the heater 150, and a lead for detecting heater resistance, which is not illustrated, through leads provided inside the ceramic body 101, which are not illustrated, to have a predetermined correspondence relationship. Application of a voltage from the pump cell power supply 30 to each pump cell of the sensor element 10 and heating by the heater 150 by being powered from the heater power supply 40 are thus performed through the electrode terminals 160.

The sensor element 10 further includes the above-mentioned main surface protective layers 170 (170a and 170b) on the pump surface and the heater surface of the ceramic body 101. The main surface protective layers 170 are layers made of alumina, having a thickness of approximately 5 μm to 30 μm, and including pores with a porosity of approximately 20% to 40%, and are provided to prevent adherence of any foreign matter and poisoning substances to the main surfaces (the pump surface and the heater surface) of the ceramic body 101 and the outer pump electrode 141 provided on the pump surface. The main surface protective layer 170a on the pump surface thus functions as a pump electrode protective layer for protecting the outer pump electrode 141.

In the present embodiment, the porosity is obtained by applying a known image processing method (e.g., binarization processing) to a scanning electron microscope (SEM) image of an evaluation target.

The main surface protective layers 170 are provided over substantially all of the pump surface and the heater surface except that the electrode terminals 160 are partially exposed in FIG. 2, but this is just an example. The main surface protective layers 170 may locally be provided in the vicinity of the outer pump electrode 141 on the side of the one end portion E1 compared with the case illustrated in FIG. 2.

<Details of Leading-End Protective Layer>

In the sensor element 10, the leading-end protective layer 2 is provided around an outermost periphery of the element base 1 having a configuration as described above in a predetermined range from the one end portion E1.

The leading-end protective layer 2 is provided in a manner of surrounding a portion of the element base 1 in which the temperature becomes high (up to approximately 700° C. to 800° C.) when the gas sensor 100 is in use, in order to secure water resistance in the portion to thereby suppress the occurrence of cracking (water-induced cracking) of the element base 1 due to thermal shock caused by local temperature reduction upon direct exposure of the portion to water.

In addition, the leading-end protective layer 2 is provided to secure poisoning resistance to prevent poisoning substances, such as Mg, from entering into the sensor element 10.

As illustrated in FIG. 2, in the sensor element 10 according to the present embodiment, the leading-end protective layer 2 includes the three layers: the first leading-end protective layer 21, the second leading-end protective layer 22, and the third leading-end protective layer 23.

The first leading-end protective layer 21 is an underlying layer provided to secure bonding (adhesion) of the second leading-end protective layer 22 formed thereon (further the third leading-end protective layer 23). The first leading-end protective layer 21 is provided at least on two main surfaces of the element base 1 on a side of the pump surface and a side of the heater surface. That is to say, the first leading-end protective layer 21 includes a first leading-end protective layer 21a on the side of the pump surface and a first leading-end protective layer 21b on the side of the heater surface. The first leading-end protective layer 21, however, is not provided on a side of the leading end surface 101e of the ceramic body 101 (of the element base 1).

The first leading-end protective layer 21 is made of alumina, has a porosity of 30% to 60%, and has a thickness of 15 μm to 50 μm. In contrast to the second leading-end protective layer 22 and the third leading-end protective layer 23, the first leading-end protective layer 21 is formed along with the element base 1 in a process of manufacturing the element base 1 as described below.

The second leading-end protective layer 22 and the third leading-end protective layer 23 are provided in this order from inside to cover the leading end surface 101e and the four side surfaces on the side of the one leading end portion E1 of the element base 1 (around an outer periphery of the element base 1 on the side of the one leading end portion E1). A portion of the second leading-end protective layer 22 on the side of the leading end surface 101e is particularly referred to as a leading-end portion 221, and a portion of the second leading-end protective layer 22 on the side of the pump surface and the side of the heater surface is particularly referred to as a main surface portion 222. Similarly, a portion of the third leading-end protective layer 23 on the side of the leading end surface 101e is particularly referred to as a leading-end portion 231, and a portion of the third leading-end protective layer 23 on the side of the pump surface and the side of the heater surface is particularly referred to as a main surface portion 232.

The second leading-end protective layer 22 is made of alumina, has a porosity of 30% to 80%, and has a thickness of 30 to 50 times the thickness of the first leading-end protective layer 21. The third leading-end protective layer 23 is made of alumina, has a porosity of 15% to 30%, and has a thickness of 5 to 10 times the thickness of the first leading-end protective layer 21. The leading-end protective layer 2 thereby has a configuration in which the second leading-end protective layer 22 having the lowest thermal conductivity of the three layers is covered with the third leading-end protective layer 23, which is provided as an outermost layer to have a smaller porosity than the second leading-end protective layer 22. The sum of the thickness of the leading-end portion 221 of the second leading-end protective layer 22 and the thickness of the leading-end portion 231 of the third leading-end protective layer 23 is greater than the sum of the thickness of the main surface portion 222 of the second leading-end protective layer 22 and the thickness of the main surface portion 232 of the third leading-end protective layer 23.

In other words, the second leading-end protective layer 22 is provided as a layer having low thermal conductivity to have a function to suppress heat conduction from the outside to the element base 1, and the third leading-end protective layer 23 has a function to maintain overall strength and a function to suppress ingress of water. The leading-end protective layer 2 has this configuration so that, even if water adheres to the surface (the surface of the third leading-end protective layer 23) when the sensor element 10 in a high temperature state is in use, ingress of water is suppressed, and cold caused by rapid cooling associated with adherence is less likely to be transferred to the element base 1. That is to say, the leading-end protective layer 2 has great thermal shock resistance. As a result, the sensor element 10 is less likely to cause water-induced cracking, and has great water resistance.

The reason why the second leading-end protective layer 22 has a thickness of 30 to 50 times the thickness of the first leading-end protective layer 21 and the third leading-end protective layer 23 has a thickness of 5 to 10 times the thickness of the first leading-end protective layer 21 is that, as the thickness of the second leading-end protective layer 22 and the thickness of the third leading-end protective layer 23 increase, thermal shock is less likely to be transferred to the element base 1, and water resistance of the sensor element 10 is improved.

However, an excessive increase in thickness of these layers is not preferable because it increases a thermal load put on the heater 150 provided inside the sensor element 10 when the sensor element 10 as a whole including the leading-end protective layer 2 is heated by the heater 150 to start use of the gas sensor 100, and, as a result, cracking of the sensor element 10 may occur. From this viewpoint, the second leading-end protective layer 22 preferably has a thickness of 1500 μm or less, and the third leading-end protective layer 23 preferably has a thickness of 300 μm or less.

The second leading-end protective layer 22 and the third leading-end protective layer 23 are formed by sequentially thermal spraying (plasma-spraying) materials for them with respect to the element base 1 having a surface on which the first leading-end protective layer 21 has been formed. This is to develop an anchoring effect between the second leading-end protective layer 22 and the first leading-end protective layer 21 formed in advance in the process of manufacturing the element base 1 to thereby secure bonding (adhesion) of the second leading-end protective layer 22 (including the third leading-end protective layer 23 formed outside the second leading-end protective layer 22) to the first leading-end protective layer 21. In other words, this means that the first leading-end protective layer 21 has a function to secure bonding (adhesion) of the second leading-end protective layer 22. Secured bonding (adhesion) in this manner suitably suppresses separation of the leading-end protective layer 2 from the element base 1 caused by thermal shock due to adherence of water droplets.

The second leading-end protective layer 22 and the third leading-end protective layer 23 are provided not to cover the first leading-end protective layer 21 (21a and 21b) as a whole but to expose an end portion of the first leading-end protective layer 21 on a side opposite the side of the one end portion E1 in the longitudinal direction of the sensor element 10. This is to more surely secure bonding (adhesion) of the second leading-end protective layer 22 (including the third leading-end protective layer 23 formed outside the second leading-end protective layer 22) to the first leading-end protective layer 21.

As described above, in the sensor element 10 according to the present embodiment, the leading-end protective layer 2 to surround the portion of the element base 1 in which the temperature becomes high when the gas sensor 100 is in use has a three-layer structure including the first leading-end protective layer 21, the second leading-end protective layer 22, and the third leading-end protective layer 23, and these layers are provided to have predetermined porosities and thicknesses, so that the first leading-end protective layer 21 has the function to secure bonding (adhesion) to the second leading-end protective layer 22, the second leading-end protective layer 22 has the function to suppress heat conduction from the outside to the element base 1, and the third leading-end protective layer 23 has the function to maintain overall strength and the function to suppress ingress of water. The leading-end protective layer 2 thereby has great resistance (thermal shock resistance) to cold caused by adherence of water droplets. As a result, the sensor element 10 has great water resistance.

<Process of Manufacturing Sensor Element>

Figure 3:
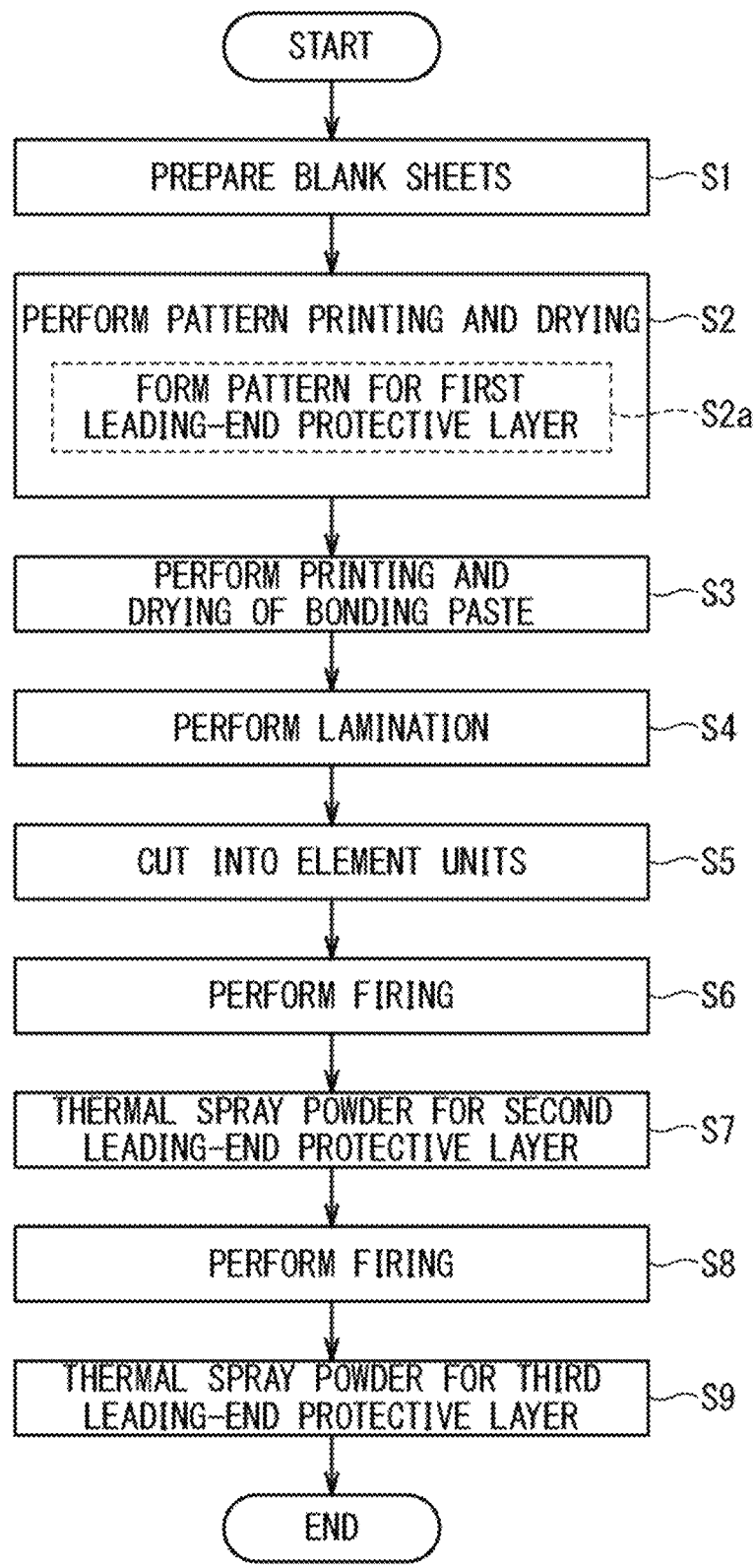
FIG. 3 is a flowchart of processing at the manufacture of the sensor element 10.

One example of a process of manufacturing the sensor element 10 having a configuration and features as described above will be described next. FIG. 3 is a flowchart of processing at the manufacture of the sensor element 10.

At the manufacture of the element base 1, a plurality of blank sheets (not illustrated) being green sheets containing the oxygen-ion conductive solid electrolyte, such as zirconia, as a ceramic component and having no pattern formed thereon are prepared first (step S1).

The blank sheets have a plurality of sheet holes used for positioning in printing and lamination. The sheet holes are formed to the blank sheets in advance prior to pattern formation through, for example, punching by a punching machine. Green sheets corresponding to a portion of the ceramic body 101 in which an internal space is formed also include penetrating portions corresponding to the internal space formed in advance through, for example, punching as described above. The blank sheets are not required to have the same thickness, and may have different thicknesses in accordance with corresponding portions of the element base 1 eventually formed.

After preparation of the blank sheets corresponding to the respective layers, pattern printing and drying are performed on the individual blank sheets (step S2). Specifically, a pattern of various electrodes, a pattern of the heater 150 and the insulating layer 151, a pattern of the electrode terminals 160, a pattern of the main surface protective layers 170, a pattern of internal wiring, which is not illustrated, and the like are formed. Application or placement of a sublimable material (vanishing material) for forming the first diffusion control part 110, the second diffusion control part 120, the third diffusion control part 130, and the fourth diffusion control part 140 is also performed at the time of pattern printing. In addition, a pattern to form the first leading-end protective layer 21 (21a and 21b) is printed onto blank sheets to become an uppermost layer and a lowermost layer after lamination (step S2a).

The patterns are printed by applying pastes for pattern formation prepared in accordance with the properties required for respective formation targets onto the blank sheets using known screen printing technology. At formation of the first leading-end protective layer 21, for example, an alumina paste that can form the first leading-end protective layer 21 having a desired porosity and thickness in the sensor element 10 eventually obtained is used. A known drying means can be used for drying after printing.

After pattern printing on each of the blank sheets, printing and drying of a bonding paste are performed to laminate and bond the green sheets (step S3). The known screen printing technology can be used for printing of the bonding paste, and the known drying means can be used for drying after printing.

The green sheets to which an adhesive has been applied are then stacked in a predetermined order, and the stacked green sheets are crimped under predetermined temperature and pressure conditions to thereby form a laminated body (step S4). Specifically, crimping is performed by stacking and holding the green sheets as a target of lamination on a predetermined lamination jig, which is not illustrated, while positioning the green sheets at the sheet holes, and then heating and pressurizing the green sheets together with the lamination jig using a lamination machine, such as a known hydraulic pressing machine. The pressure, temperature, and time for heating and pressurizing depend on a lamination machine to be used, and these conditions may be determined appropriately to achieve good lamination. The pattern to form the first leading-end protective layer 21 may be formed on the laminated body obtained in this manner.

After the laminated body is obtained as described above, the laminated body is cut out at a plurality of locations to obtain unit bodies eventually becoming the individual element bases 1 (step S5).

The unit bodies as obtained are then each fired at a firing temperature of approximately 1300° C. to 1500° C. (step S6). The element base 1 having main surfaces on which the first leading-end protective layer 21 is provided is thereby manufactured. That is to say, the element base 1 is generated by integrally firing the ceramic body 101 made of the solid electrolyte, the electrodes, and the main surface protective layers 170 along with the first leading-end protective layer 21. Integral firing is performed in this manner, so that the electrodes each have sufficient adhesion strength in the element base 1.

After the element base 1 is manufactured in the above-mentioned manner, the second leading-end protective layer 22 and the third leading-end protective layer 23 are formed with respect to the element base 1. The second leading-end protective layer 22 is formed by thermal spraying powder (alumina powder) for forming the second leading-end protective layer prepared in advance at a location of the element base 1 as a target of formation of the second leading-end protective layer 22 to have an intended thickness (step S7), and then firing the element base 1 on which an applied film has been formed in the above manner (step S8). The alumina powder for forming the second leading-end protective layer 22 contains alumina powder having predetermined particle size distribution and a pore-forming material at a ratio corresponding to a desired porosity, and the pore-forming material is pyrolyzed by firing of the element base 1 after thermal spraying to suitably form the second leading-end protective layer 22 having a high porosity of 30% to 80%. Known technology is applicable to thermal spraying and firing.

Upon formation of the second leading-end protective layer 22, powder (alumina powder) for forming the third leading-end protective layer similarly prepared in advance and containing alumina powder having predetermined particle size distribution is thermal sprayed at a location of the element base 1 as a target of formation of the third leading-end protective layer 23 to have an intended thickness (step S9) to thereby form the third leading-end protective layer 23 having a desired porosity. The alumina powder for forming the third leading-end protective layer does not contain the pore-forming material. Known technology is also applicable to the thermal spraying.

The sensor element 10 is obtained by the above-mentioned procedures. The sensor element 10 thus obtained is housed in a predetermined housing, and built into the body (not illustrated) of the gas sensor 100.

<Modifications>

The above-mentioned embodiment is targeted at a sensor element having three internal chambers, but the sensor element is not necessarily required to have a three-chamber structure. That is to say, the sensor element may have one internal chamber or two internal chambers.

EXAMPLES

Thirteen types of sensor elements 10 (Samples No. 1 to No. 13) having different combinations of intended thicknesses t1, t2, and t3 of the first leading-end protective layer (hereinafter, the first layer) 21, the second leading-end protective layer (hereinafter, the second layer) 22, and the third leading-end protective layer (hereinafter, the third layer) 23 and porosities of the second layer 22 and the third layers 23 and a sensor element (Sample No. 14) not having the leading-end protective layer were manufactured. The first layer 21, the second layer 22, and the third layer 23 were each made of alumina.

A water resistance test was conducted on each of the sensor elements 10 as obtained. The water resistance test was conducted by applying a water droplet of 0.1 μL at a time to the side of the pump surface of the sensor element 10 while measuring the pump current through the main pump cell P1 in a state of the sensor element 10 being heated by the heater 150 to approximately 500° C. to 900° C., and evaluating the maximum amount of water causing no abnormalities in an output of measurement. In these Examples, the maximum amount of water in the above case is referred to as "water resistance" (in μL). It is considered that any abnormality occurs in the output of measurement in the water resistance test because the leading-end protective layer 2 is subjected to thermal shock to cause cracking of the sensor element 10, so that a value of "water resistance" in these Examples serves as an indicator of how unlikely cracking is to be caused and further as an indicator of thermal shock resistance of the leading-end protective layer 2.

The intended thicknesses (film thicknesses) t1, t2, and t3 of the respective layers, a ratio t2/t1, a ratio t3/t1, the porosities of the second layer 22 and the third layer 23, and the results of evaluation of water resistance are shown for each of the samples in Table 1 as a list.

TABLE 1

| SAMPLE NO. | FIRST LAYER FILM THICKNESS t1 (μm) | SECOND LAYER FILM THICKNESS t2 (μm) | THIRD LAYER FILM THICKNESS t3 (μm) | RATIO t2/t1 | RATIO t3/t1 | SECOND LAYER POROSITY (%) | THIRD LAYER POROSITY (%) | WATER RESISTANCE (μL) |
|---|---|---|---|---|---|---|---|---|
| 1 | 20 | 200 | 200 | 10 | 10 | 50 | 20 | 7.0 |
| 2 | 20 | 400 | 200 | 20 | 10 | 50 | 20 | 9.2 |
| 3 | 20 | 600 | 200 | 30 | 10 | 50 | 20 | 25.6 |
| 4 | 20 | 1000 | 200 | 50 | 10 | 50 | 20 | 100.3 |
| 5 | 20 | 600 | 200 | 30 | 10 | 30 | 20 | 12.1 |
| 6 | 20 | 600 | 200 | 30 | 10 | 80 | 20 | 26.4 |
| 7 | 20 | 600 | NOT PROVIDED | 30 | — | 50 | — | 5.9 |
| 8 | 20 | 600 | 50 | 30 | 2.5 | 50 | 20 | 9.0 |
| 9 | 20 | 600 | 100 | 30 | 5 | 50 | 20 | 15.4 |
| 10 | 20 | 600 | 200 | 30 | 10 | 50 | 50 | 9.0 |
| 11 | 20 | 600 | 200 | 30 | 10 | 50 | 15 | 29.1 |
| 12 | 20 | 600 | 200 | 30 | 10 | 50 | 30 | 34.1 |
| 13 | 20 | 600 | 200 | 30 | 10 | 20 | 20 | 7.0 |
| 14 | NOT PROVIDED | NOT PROVIDED | NOT PROVIDED | — | — | — | — | 0.8 |

As shown in Table 1, the sensor elements 10 in No. 1 to No. 13 each including the leading-end protective layer 2 had water resistance of at least seven times the water resistance of the sensor element 10 in No. 14 not including the leading-end protective layer 2, and, among them, the sensor elements 10 other than the sensor element 10 in No. 7 not including the third layer 23 had water resistance of approximately nine times the water resistance of the sensor element 10 in No. 14. The sensor elements 10 in No. 3 to No. 6, No. 9, No. 11, and No. 12 had particularly high values of 12 μL or more.

The results show that, in a case where the sensor element 10 is manufactured to satisfy the condition that the second layer 22 has a porosity of 30% to 80% and has a thickness of 30 to 50 times the thickness of the first layer 21, and the third layer 23 has a porosity of 15% to 30% and has a thickness of 5 to 10 times the thickness of the first layer 21, the sensor element 10 having greater thermal shock resistance in the leading-end protective layer 2, and thus having greater water resistance than that not satisfying the condition can be obtained.

The sensor elements 10 in No. 3, No. 4, No. 6, No. 9, No. 11, and No. 12 had particularly higher values of water resistance of 15 μL or more. This shows that, in a case where the second layer 22 has a porosity of 50% to 80%, the sensor element 10 having greater thermal shock resistance in the leading-end protective layer 2, and thus having greater water resistance can be obtained.

While the invention has been shown and described in detail, the foregoing description is in all aspects illustrative and not restrictive. It is therefore understood that numerous modifications and variations can be devised without departing from the scope of the invention.

What is claimed is:

1. A sensor element for a gas sensor comprising:
   an element base being a ceramic structure including a sensing part to sense a gas component to be measured; and
   a leading-end protective layer being a porous layer, disposed around an outer periphery of said element base in a predetermined range from an end portion of said element base on a side of said sensing part, and including:
   a first leading-end protective layer disposed at least on two main surfaces of said element base;
   a second leading-end protective layer disposed to cover said end portion and four side surfaces of said element base including said two main surfaces on which said first leading-end protective layer is disposed; and
   a third leading-end protective layer disposed to cover said second leading-end protective layer, wherein
   said second leading-end protective layer has a porosity of 30% to 80%, and has a thickness of 30 to 50 times thickness of said first leading-end protective layer,
   said third leading-end protective layer has a porosity of 15% to 30%, and has a thickness of 5 to 10 times the thickness of said first leading-end protective layer, and
   said first leading-end protective layer has a porosity of 30% to 60%, and has a thickness of 15 μm to 50 μm.

2. The sensor element according to claim 1, wherein said second leading-end protective layer has a porosity of 50% to 80%.

3. The sensor element according to claim 2, wherein said second leading-end protective layer has a thickness of 1500 μm or less, and said third leading-end protective layer has a thickness of 300 μm or less.

4. The sensor element according to claim 1, wherein said second leading-end protective layer has a thickness of 1500 μm or less, and said third leading-end protective layer has a thickness of 300 μm or less.

* * * * *